United States Patent [19]

Hirota

[11] Patent Number: 4,646,165
[45] Date of Patent: Feb. 24, 1987

[54] CHROMINANCE SIGNAL RECORDING APPARATUS UTILIZING DIGITAL SAMPLING AND QUANTIZING TECHNIQUES

[75] Inventor: Akira Hirota, Chigasaki, Japan

[73] Assignee: Victor Company of Japan Ltd., Yokohama, Japan

[21] Appl. No.: 673,133

[22] Filed: Nov. 19, 1984

[30] Foreign Application Priority Data

Nov. 21, 1983 [JP] Japan .............................. 58-219155
Nov. 21, 1983 [JP] Japan .............................. 58-219156

[51] Int. Cl.⁴ .......................................... H04N 9/493
[52] U.S. Cl. .................................... 358/310; 358/328; 360/36.2
[58] Field of Search ............... 358/310, 328; 360/36.2

[56] References Cited

U.S. PATENT DOCUMENTS 4,145,704  3/1979  Gallo .................................. 358/312

Primary Examiner—Robert L. Richardson
Attorney, Agent, or Firm—Roberts, Spiecens & Cohen

[57] ABSTRACT

A carrier chrominance signal recording apparatus comprises a first circuit for sampling a carrier chrominance signal at a sampling frequency which is four times a chrominance subcarrier frequency, and then quantizing the sampled signal so as to produce a first digital color signal, a second circuit for subjecting the first digital color signal to a phase shift process so as to produce a second digital color signal related to a carrier chrominance signal in which the phase of a chrominance subcarrier is equivalently and successively shifted by approximately 90° in a predetermined direction for every one horizontal scanning period, a third circuit for converting the output second digital color signal of the second circuit into a frequency converted digital color signal which is in a low-frequency range, a circuit for obtaining an analog frequency converted carrier chrominance signal by subjecting the frequency converted digital color signal to a digital-to-analog conversion, and a circuit for recording the analog frequency converted carrier chrominance signal on a recording medium. A reproducing apparatus reproduces the signals recorded on the recording medium by the above recording apparatus.

8 Claims, 9 Drawing Figures

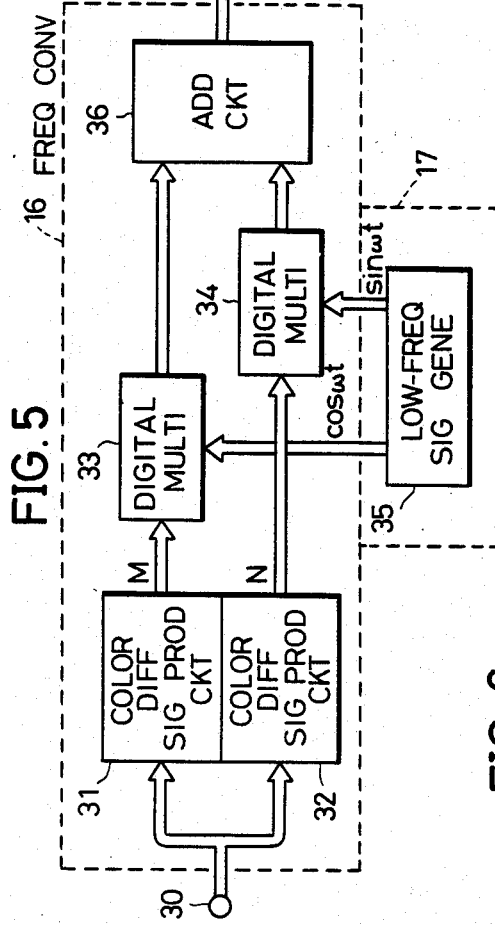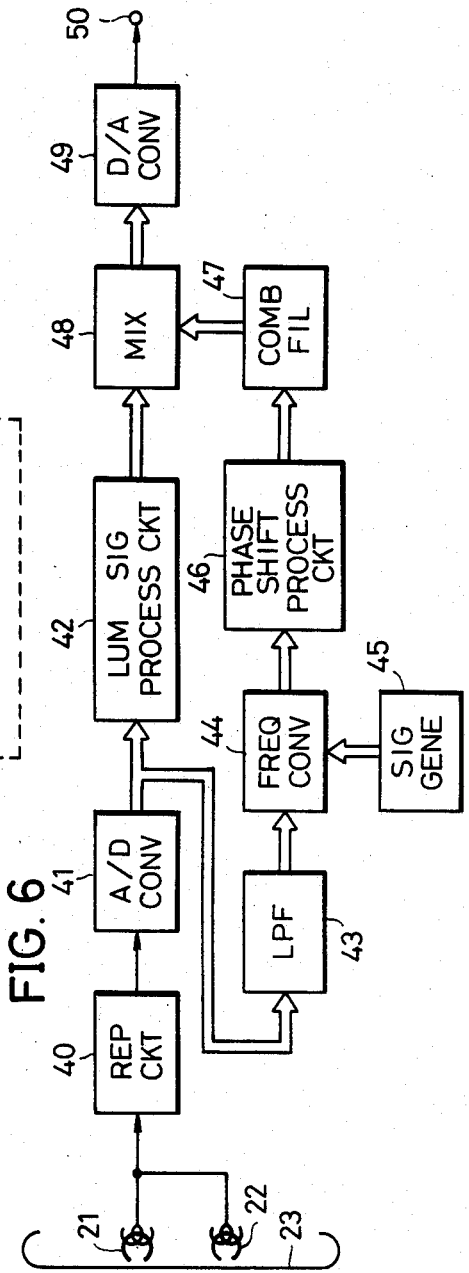

CHROMINANCE SIGNAL RECORDING APPARATUS UTILIZING DIGITAL SAMPLING AND QUANTIZING TECHNIQUES

BACKGROUND OF THE INVENTION

The present invention generally relates to carrier chrominance signal recording and/or reproducing apparatuses, and more particularly to a carrier chrominance signal recording and/or reproducing apparatus which shifts by a digital processing the phase of a chrominance subcarrier of a frequency converted carrier chrominance signal which is reproduced as crosstalk from adjacent tracks, when recording or reproducing a carrier chrominance signal within a color video signal on or from a recording medium according to the azimuth recording and reproducing system.

Among the helical scan type video tape recorders (VTRs) which employ the azimuth recording and reproducing system, the more popular VTRs record a frequency division multiplexed signal on video tracks on a magnetic tape by alternately forming the video tracks by a pair of rotary heads having gaps of mutually different azimuth angles at the time of a recording, and reproduce the frequency division multiplexed signal from the video tracks at the time of a reproduction. The frequency division multiplexed signal is made up of a frequency modulated luminance signal and a frequency converted carrier chrominance signal. The frequency modulated luminance signal is obtained by frequency-modulating a luminance signal which is separated from a composite color video signal of a standard system such as the NTSC, PAL, and SECAM systems. On the other hand, the frequency converted carrier chrominance signal is obtained by frequency-converting or counting down a carrier chrominance signal which is separated from the composite color video signal to a low-frequency range. In order to obtain a high recording density, no guard band is formed or a guard band of an extremely narrow width is formed between two adjacent video tracks.

It is possible to eliminate the need for a guard band or make the width of the guard band extremely narrow, because the frequency division multiplexed signal is hardly reproduced from the adjacent tracks due to the azimuth loss effect when the video tracks are successively and alternately scanned by the pair of rotary heads having the gaps of mutually different azimuth angles. However, although the azimuth loss effect is sufficient with respect to high-frequency components, the azimuth loss effect is insufficient with respect to low-frequency components. As a result, there is a problem in that the frequency converted carrier chrominance signal within the frequency division multiplexed signal, which is in the low-frequency range, is reproduced from the adjacent tracks as crosstalk.

In order to eliminate the problem described above, a recording and/or reproducing system was previously proposed in a U.S. Pat. No. 4,178,606 in which the assignee is the same as the assignee of the present application. According to this previously propossed system, the phase of the chrominance subcarrier of the frequency converted carrier chrominance signal which is obtained by frequency-converting the carrier chrominance signal of the NTSC or PAL system, is shifted by approximately 90° in a predetermined direction for every one horizontal scanning period (1H) when carrying out the recording with respect to one of the two adjacent tracks, and is shifted by approximately 90° in a direction opposite to the predetermined direction for every 1H when carrying out the recording with respect to the other of the two adjacent tracks in the case of the NTSC system carrier chrominance signal and is not shifted when carrying out the recording with respect to the other of the two adjacent tracks in the case of the PAL system carrier chrominance signal. A phase shift process complementary to the phase shift process performed at the time of the recording, is performed at the time of the reproduction. The frequency converted carrier chrominance signal which is reproduced as crosstalk from the adjacent tracks, is eliminated by the phase shift process and by the use of a comb filter.

In the previously proposed system, an analog circuit is used to perform the phase shift process. A pulse signal in which the phase is shifted by 90° for every 1H and which has a repetition frequency of $40f_H$, for example, where $f_H$ represents the horizontal scanning frequency, and an output signal of an oscillator having the same frequency as the chrominance subcarrier, are respectively subjected to a frequency conversion in a first frequency converter. An output signal of the first frequency converter is supplied to an analog bandpass filter which produces a frequency component corresponding to a sum of the frequencies of the two signals supplied to the first frequency converter. The output frequency component of the analog bandpass filter and the carrier chrominance signal are subjected to a frequency conversion in a second frequency converter, and a frequency component corresponding to a frequency difference between the two signals, that is, the frequency converted carrier chrominance signal, is obtained from the second frequency converter.

However, the passband of the bandpass filter is selected to a relatively narrow band, so as to eliminate unwanted components and noise. Hence, even when the phase of the output signal of the first frequency converter supplied to the bandpass filter is accurately shifted by 90° for every 1H, the waveform of the output frequency component of the bandpass filter becomes rounded at switching points where the phase switches. This rounded waveform of the output frequency component of the bandpass filter sometimes affects the phase of the color burst signal within the frequency converted carrier chrominance signal.

SUMMARY OF THE INVENTION

Accordingly, it is a general object of the present invention to provide a novel and useful carrier chrominance signal recording and/or reproducing apparatus in which the problems described heretofore are eliminated.

Another and more specific object of the present invention is to provide a carrier chrominance signal recording and/or reproducing apparatus which rearranges the data sequence and inverts the polarity of data if necessary in each of data sets at the time of a recording, where each data set is made up of four or two consecutive sampled data in a digital color signal which is obtained by sampling a carrier chrominance signal at a frequency which is four times the chrominance subcarrier frequency, so as to shift the phase of the digital color signal by 90° for every one horizontal scanning period (1H) before converting the digital color signal into a low-frequency range. At the time of a reproduction, a reproduced digital color signal is returned to the original frequency range, and a rearrangement of the data sequence and an inversion of the polarity of data are performed similarly as at the time of the recording so as to eliminate the phase shift of 90° which occurs for every 1H. According to the apparatus of the present invention, the waveform of the carrier chrominance signal can be made sharp at the points where the switching of the phase take place, compared to the conventional apparatus which uses an analog circuit. Thus, according to the present invention, it is possible to perform the phase shift process without introducing an undesirable effect on the phase of the color burst signal. In addition, the reliability of the apparatus according to the present invention is high because the signal processing is performed digitally. Moreover, it is possible to downsize the apparatus by use of an integrated circuit.

Still another object of the present invention is to provide a carrier chrominance signal recording apparatus which separates two kinds of digital color difference signals from a digital color signal which is obtained by sampling at least the carrier chrominance signal at the frequency which is four times the chrominance subcarrier frequency, and records the two kinds of digital color difference signals on a recording medium after independently converting the two kinds of color difference signals into a low-frequency range. According to the apparatus of the present invention, it is possible to obtain a frequency converted carrier chrominance signal which is to be recorded, by performing a digital processing at a sampling frequency which is lower than the sampling frequency with which a processing takes place in a digital circuit in a case where the conventional frequency converting circuit which uses an analog circuit is designed in the form of the digital circuit.

A further object of the present invention is to provide a carrier chrominance signal reproducing apparatus which converts an analog frequency converted carrier chrominance signal which is reproduced from a recording medium into a digital color signal by sampling the analog frequency converted carrier chrominance signal at a sampling frequency which is four times the chrominance subcarrier frequency, and separates two kinds of digital color difference signals from the digital color signal by use of a digital multiplier. The two kinds of digital color difference signals and digital color difference signals which are inverted of their polarity, are successively and selectively produced responsive to a switching signal having a frequency which is equal to the sampling frequency. According to the apparatus of the present invention, it is possible to reproduce a digital color signal which is obtained by sampling the carrier chrominance signal which is returned to the original frequency range at a sampling frequency which is four times the chrominance subcarrier frequency. The sampling frequency, the switching signal frequency, and the multiplication signal frequencies are relatively low, and thus, it is easy to realize the circuit in the form of an integrated circuit.

Other objects and further features of the present invention will be apparent from the following detailed description when read in conjunction with the accompanying drawings.

BRIEF DESCRIPTION OF THE DRAWINGS

FIG. 5 is a systematic block diagram showing an embodiment of an essential part of the block system shown in FIG. 1;

FIG. 6 is a systematic block diagram showing an embodiment of a reproducing system of the carrier chrominance signal recording and/or reproducing apparatus according to the present invention;

DETAILED DESCRIPTION

Figure 1:
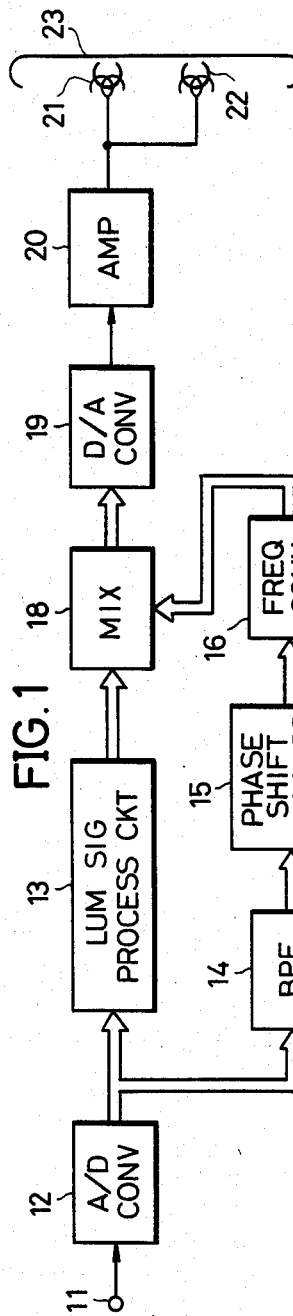
FIG. 1 is a systematic block diagram showing an embodiment of a recording system of the carrier chrominance signal recording and/or reproducing apparatus according to the present invention.

In FIG. 1, an NTSC system color video signal which is to be recorded, is applied to an input terminal 11 and is supplied to an analog-to-digital (A/D) converter 12. The color video signal is converted into a digital signal in the A/D converter 12, by being sampled at a sampling frequency $f_s$ which is four times a chrominance subcarrier frequency $f_{sc}$ (3.58 MHz in the case of the NTSC system) of the color video signal and then quantized. The output digital signal of the A/D converter 12, comprises a digital luminance signal and a digital color signal. The digital luminance signal is separated in a luminance signal processing circuit 13, and the luminance signal processing circuit 13 produces a digital signal which corresponds to a frequency modulated luminance signal.

On the other hand, the digital color signal is separated in a bandpass filter 14, and is supplied to a phase shift processing circuit 15. The digital color signal supplied to the phase shift processing circuit 15, is obtained by sampling an analog carrier chrominance signal indicated by a solid line in FIG. 2(A) with a period T $(=1/4f_{sc})$, at points $D_{11}$, $D_{12}$, $D_{13}$, $D_{14}$, $D_{21}$, $D_{22}$, $D_{23}$, $D_{24}$, $D_{31}$, $D_{32}$, ..., and then quantizing the signal. In other words, the carrier chrominance signal is converted into four sampled data in one period. Thus, four sampled data $D_{i1}$, $D_{i2}$, $D_{i3}$, and $D_{i4}$ in one period, may be considered as sampled data which are obtained when the phase of the chrominance subcarrier is equal to 0°, 90°, 180°, and 270°, where i is an integer. That is, the four sampled data $D_{i1}$, $D_{i2}$, $D_{i3}$, and $D_{i4}$ in one period, are considered as being four sampled data which are obtained at four sampling points where the phase of the chrominance subcarrier mutually differ by 90°.

Figure 3:
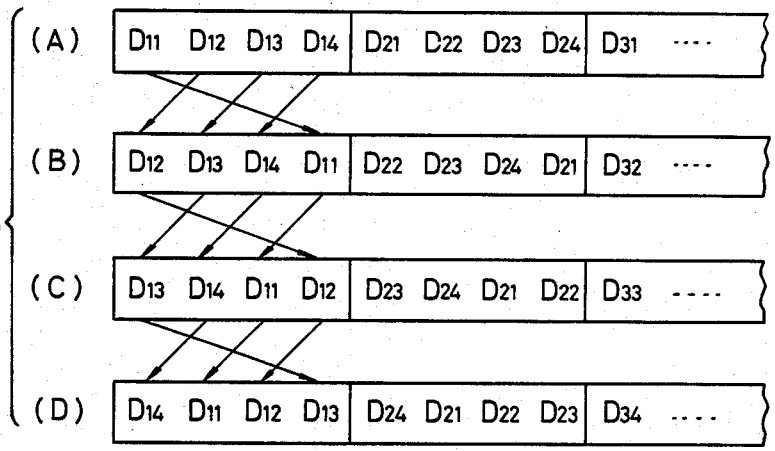
FIGS. 3(A) through 3(D) schematically show data sequences of sampled data for explaining an embodiment of the operation of a phase shift processing circuit in the carrier chrominance signal recording and/or reproducing apparatus according to the present invention.

The digital color signal which is supplied to the phase shift processing circuit 15, is a time sequentially multiplexed signal in which the sampled data are arranged in the sequence shown in FIG. 3(A) for every one horizontal scanning period (1H). During one time period of 1H, the phase shift processing circuit 15 produces the input digital color signal with the sequence of the sampled data unchanged.

On the other hand, during a next time period of 1H, the phase shift processing circuit 15 produces the input digital color signal shown in FIG. 3(A) with the sequence of the sampled data rearranged as shown in FIG. 3(B). In other words, the four sampled data $D_{i1}$ through $D_{i4}$ are considered as a data set, and the sampled data $D_{i1}$ in the first position of the data set is rearranged to a last position of the data set, so that the four sampled data in the data set are arranged in a sequence of the sampled data $D_{i2}$, $D_{i3}$, $D_{i4}$, and $D_{i1}$ as shown in FIG. 3(B). The sampled data arranged in the sequence shown in FIG. 3(B) may be considered as being the sampled data obtained when the phase of the chrominance subcarrier is advanced by 90° with respect to the phase of the chrominance subcarrier at the time when the sampled data arranged in the sequence shown in FIG. 3(A) is obtained 1H before.

Similarly, during a next time period of 1H, the phase shift processing circuit 15 produces the input digital color signal shown in FIG. 3(A) with the sequence of the sampled data rearranged as shown in FIG. 3(C). In other words, the four sampled data $D_{i1}$ through $D_{i4}$ are considered as a data set, and the sampled data $D_{i1}$ in the first position of the data set is rearranged to a third position of the data set and the sampled data $D_{i2}$ in the second position of the data set is rearranged to a last position of the data set, so that the four sampled data in the data set are arranged in a sequence of the sampled data $D_{i3}$, $D_{i4}$, $D_{i1}$, and $D_{i2}$ as shown in FIG. 3(C). The sampled data arranged in the sequence shown in FIG. 3(C) may be considered as being the sampled data obtained when the phase of the chrominance subcarrier is advanced by 180° with respect to the phase of the chrominance subcarrier at the time when the sampled data arranged in the sequence shown in FIG. 3(A) is obtained 2H before. In other words, the sampled data arranged in the sequence shown in FIG. 3(C) may be considered as being the sampled data obtained when the phase of the chrominance subcarrier is advanced by 90° with respect to the phase of the chrominance subcarrier at the time when the sampled data arranged in the sequence shown in FIG. 3(B) is obtained 1H before.

Further, during a next time period of 1H, the phase shift processing circuit 15 produces the input digital color signal shown in FIG. 3(A) with the sequence of the sampled data rearranged as shown in FIG. 3(D). In other words, the four sampled data $D_{i1}$ through $D_{i4}$ are considered as a data set, and the sampled data $D_{i1}$ in the first position of the data set is rearranged to a second position of the data set, the sampled data $D_{i2}$ in the second position of the data set is rearranged to the third position of the data set, and the sampled data $D_{i3}$ in the third position of the data set is rearranged to a last position of the data set, so that the four sampled data in the data set are arranged in a sequence of the sampled data $D_{i4}$, $D_{i1}$, $D_{i2}$, and $D_{i3}$ as shown in FIG. 3(D). The sampled data arranged in the sequence shown in FIG. 3(D) may be considered as being the sampled data obtained when the phase of the chrominance subcarrier is advanced by 270° with respect to the phase of the chrominance subcarrier at the time when the sampled data arranged in the sequence shown in FIG. 3(A) is obtained 3H before. In other words, the sampled data arranged in the sequence shown in FIG. 3(D) may be considered as being the sampled data obtained when the phase of the chrominance subcarrier is advanced by 90° with respect to the phase of the chrominance subcarrier at the time when the sampled data arranged in the sequence shown in FIG. 3(C) is obtained 1H before.

Thereafter, the phase shift processing circuit 15 repeats the operation described heretofore in conjunction with FIGS. 3(A) through 3(D), and produces a digital color signal related to a carrier chrominance signal in which the phase of the chrominance subcarrier is equivalently advanced by 90° for every 1H. When the recording is carried out with respect to a signal of the NTSC system, the direction in which the phase shift is performed is reversed for every one track scanning period, responsive to a drum pulse signal which is produced from a known means.

The following relationships stand among the levels of the sampled data $D_{i1}$ through $D_{i4}$.

$$D_{i1} \approx -D_{i3}$$

$$D_{i2} \approx -D_{i4}$$

For this reason, the phase shift processing circuit 15 may perform the phase shift process in the following manner. That is, with respect to the digital color signal having the data sequence shown in FIG. 4(A) for every 1H, the phase shift processing circuit 15 produces the input digital color signal with the sequence of the sampled data unchanged for a certain time period of 1H.

Figure 4:
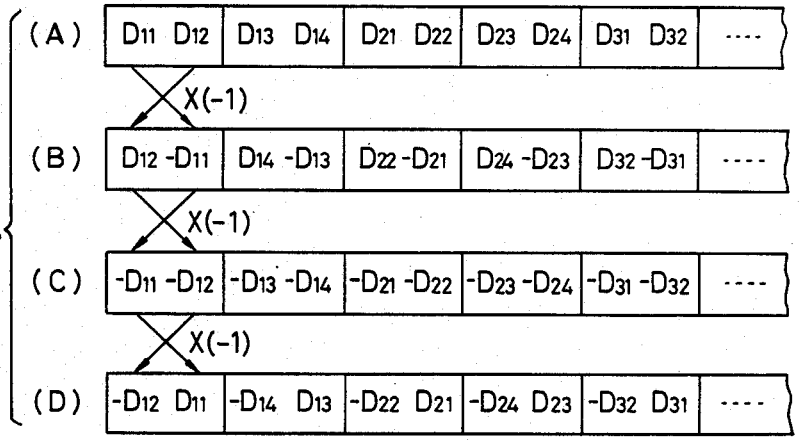
FIGS. 4(A) through 4(D) schematically show data sequences of sampled data for explaining another embodiment of the operation of a phase shift processing circuit in the carrier chrominance signal recording and/or reproducing apparatus according to the present invention.

During a next time period of 1H, the phase shift processing circuit 15 produces the input digital color signal shown in FIG. 4(A) with the sequence of the sampled data rearranged and with the polarity of the sampled data inverted as shown in FIG. 4(B). In other words, two adjacent sampled data (the sampled data $D_{i1}$ and $D_{i2}$ or the sampled data $D_{i3}$ and $D_{i4}$, for example) among the four sampled data $D_{i1}$ through $D_{i4}$ are considered as a data set, and the sequence of the two sampled data in each data set is rearranged (reversed), and further, the polarity of the sampled data originally arranged in a first position of the data set is inverted by multiplying $-1$ to the sampled data. The sampled data arranged in the sequence shown in FIG. 4(B) may be considered as being the sampled data obtained when the phase of the chrominance subcarrier is advanced by 90° with respect to the phase of the chrominance subcarrier at the time when the sampled data arranged in the sequence shown in FIG. 4(A) is obtained 1H before.

During a next time period of 1H, the phase shift processing circuit 15 produces the input digital color signal shown in FIG. 4(A) with the sequence of the sampled data unchanged but with the polarity of all of the sampled data inverted as shown in FIG. 4(C). It is evident from the description of FIGS. 4(A) and 4(B) that the sampled data arranged in the sequence shown in FIG. 4(C) may be considered as being the sampled data obtained when the phase of the chrominance subcarrier is advanced by 90° with respect to the phase of the chrominance subcarrier at the time when the sampled data arranged in the sequence shown in FIG. 4(B) is obtained 1H before.

Further, during a next time period of 1H, the phase shift processing circuit 15 produces the input digital color signal shown in FIG. 4(A) with the sequence of the sampled data rearranged and with the polarity of the sampled data inverted as shown in FIG. 4(D). In other words, two adjacent sampled data (the sampled data $D_{i1}$ and $D_{i2}$ or the sampled data $D_{i3}$ and $D_{i4}$, for example) among the four sampled data $D_{i1}$ through $D_{i4}$ are considered as a data set, and the sequence of the two sampled data in each data set is rearranged (reversed), and further, the polarity of the sampled data originally arranged in a latter position of the data set is inverted by multiplying $-1$ to the sampled data. The sampled data arranged in the sequence shown in FIG. 4(D) may be considered as being the sampled data obtained when the phase of the chrominance subcarrier is advanced by 90° with respect to the phase of the chrominance subcarrier at the time when the sampled data arranged in the sequence shown in FIG. 4(C) is obtained 1H before.

Thereafter, the phase shift processing circuit 15 repeats the operation described heretofore in conjunction with FIGS. 4(A) through 4(D), and produces a digital color signal related to a carrier chrominance signal in which the phase of the chrominance subcarrier equivalently advanced by 90° for every 1H.

The output digital color signal of the phase shift processing circuit 15 is supplied to a frequency converter 16 wherein the digital color signal is frequency-converted into a low-frequency range with an output signal of a signal generator 17. A frequency converted digital color signal which is obtained from the frequency converter 16, is supplied to a mixing circuit 18.

The frequency converter 16 is a digital circuit which performs a digital processing. In a case where the frequency converter 16 is designed by use of the conventional digital circuit technology, the frequency converter 16 may be constituted by a digital multiplier and a lowpass filter. Further, the signal generator 17 may be constituted by a local oscillator which produces a digital signal. Hence, the digital multiplier multiplies the digital color signal with the output digital signal of the local oscillator, and produces digital signals respectively corresponding to a sum and a difference between the frequencies of the two signals. The frequency component corresponding to the frequency difference between the two signals, is obtained from the lowpass filter. The output digital signal of the lowpass filter is a digital signal corresponding to the frequency converted carrier chrominance signal.

The chrominance subcarrier frequency of the carrier chrominance signal is the NTSC system color video signal, is equal to 3.58 MHz. In order to convert this NTSC system carrier chrominance signal into a frequency converted carrier chrominance signal in which the chrominance subcarrier frequency is equal to 629 kHz as is done in the existing video tape recorder (VTR), the local oscillator must have an output oscillation frequency of approximately 4.2 MHz. As a result, the digital multiplier will produce a digital signal which corresponds to the frequency difference and has a frequency of 629 kHz, and a digital signal which corresponds to the sum of the frequencies and has a frequency of approximately 7.78 MHz. Hence, in order to eliminate the aliasing noise, the sampling frequency of the input digital color signal must be selected to a frequency which is two or more times a maximum frequency of approximately 7.78 MHz+500 kHz, that is, to a high frequency which is greater than or equal to approximately 18 MHz, so that the digital signal which corresponds to the sum of the frequencies and has the frequency of approximately 7.78 MHz is also transmitted with a satisfactory accuracy. However, when the sampling frequency of the input digital color signal is selected to such a high frequency, it becomes extremely difficult to realize the digital multiplier and the like in the form of an integrated circuit.

Accordingly, in the present embodiment of the recording system, the frequency converter 16 is constructed as shown in FIG. 5. In FIG. 5, the output digital color signal of the phase shift processing circuit 15 is applied to an input terminal 30, and is supplied to color difference signal producing circuits 31 and 32. The digital color signal is transmitted with the data sequence changed for every 1H as shown in FIGS. 3(A) through 3(D) or as shown in FIGS. 4(A) through 4(D). For convenience' sake, it will be assumed that the digital color signal having the data sequence shown in FIGS. 3(A) and 4(A) is applied to the input terminal 30 during one time period of 1H.

The carrier chrominance signal is obtained by subjecting the chrominance subcarrier to a quadrature modulation by two kinds of color difference signals M and N, where the color difference signals M and N are color difference signals R-Y and B-Y or I and Q signals, respectively. When the phase of the chrominance subcarrier is equal to 0°, the color difference signal M is obtained and the color difference signal N is not obtained, because $\cos\theta=1$ and $\sin\theta=0$. When the phase of the chrominance subcarrier is equal to 90°, the color difference signal M is not obtained and the color difference signal N is obtained, because $\cos\theta=0$ and $\sin\theta=1$. When the phase of the chrominance subcarrier is equal to 180°, the color difference signal M is obtained with the polarity inverted and the color difference signal N is not obtained, because $\cos\theta=-1$ and $\sin\theta=0$. Further, when the phase of the chrominance subcarrier is equal to 270°, the color difference signal M is not obtained and the color difference signal N is obtained with the polarity inverted, because $\cos\theta=0$ and $\sin\theta=-1$.

Accordingly, among the sampled data making up the input digital color signal, the color difference signal producing circuit 31 extracts every other sampled data, that is, the sampled data $D_{i1}$ and $D_{i3}$, and alternately inverts the polarity of the extracted sampled data. As a result, the sampled data of the color difference signal M is obtained for every 180°, and the sampled data are stored in a memory (not shown) within the color difference signal producing circuit 31. The color difference signal producing circuit 31 produces averaged data calculated from the extracted sampled data, for example, instead of the sampled data which are not extracted, that is, instead of the sampled data $D_{i2}$ and $D_{i4}$. Thus, the color difference signal producing circuit 31 produces the sampled data $D_{11}$, $(D_{11}-D_{13})/2$, $-D_{13}$, $(-D_{13}+D_{21})/2$, $D_{21}$, $(D_{21}-D_{23})/2$, $-D_{23}$, ... which are arranged in this sequence, as sampled data of the color difference signal M. The averaged data which make up every other sampled data of the color difference signal M, are extremely good approximately of the original sampled data which are not extracted.

The circuit construction of the color difference signal producing circuit 32 is similar to the circuit construction of the color difference signal producing circuit 31. However, among the sampled data making up the input digital color signal, the color difference signal producing circuit 32 extracts every other sampled data, that is, the sampled data $D_{i2}$ and $D_{i4}$, and alternately inverts the polarity of the extracted sampled data. As a result, the sampled data of the color difference signal N is obtained for every 180°, and the sampled data are stored in a memory (not shown) within the color difference signal producing circuit 32. The color difference signal producing circuit 32 produces averaged data calculated from the extracted sampled data, for example, instead of the sampled data which are not extracted, that is, instead of the sampled data $D_{i1}$ and $D_{i3}$. Thus, the color difference signal producing circuit 32 produces the sampled data $D_{12}$, $(D_{12}-D_{14})/2$, $-D_{14}$, $(-D_{14}+D_{22})/2$, $D_{22}$, $(D_{22}-D_{24})/2$, $-D_{24}$, ... which are arranged in this sequence, as sampled data of the color difference signal N. The averaged data which make up every other sampled data of the color difference signal N, are extremely good approximations of the origianl sampled data which are not extracted.

It was described before that the four sampled data $D_{i1}$, $D_{i2}$, $D_{i3}$, and $D_{i4}$ respectively correspond to the sampled data obtained when the phase of the chrominance subcarrier is equal to 0°, 90°, 180°, and 270°, however, the four sampled data need not satisfy such a relationship. The four sampled data $D_{i1}$, $D_{i2}$, $D_{i3}$, and $D_{i4}$ respectively correspond to the sampled data obtained at times when the phase of the chrominance subcarrier mutually differ by 90°, and thus, every other sampled data become the sampled data which make up one of the two kinds of quadrature modulated color difference signals. In this case, the color difference signal producing circuit 31 and 32 can operate as described before, and produce digital color difference signals respectively related to the color difference signals M and N. In this case, it is of course possbile to reproduce the correct color, since the sampling points of the color burst signal correspond to the sampling points of the carrier chrominance signal.

A first digital color difference signal (sampled data) related to the color difference signal M, is produced from the color difference signal producing circuit 31 and is supplied to a digital multiplier 33. On the other hand, a second digital color difference signal (sampled data) related to the color difference signal N, is produced from the color difference signal producing circuit 32 and is supplied to a digital multiplier 34. The digital multipliers 33 and 34 are also supplied with respective output digital signals of a low-frequency signal generator 35 which corresponds to the signal generator 17.

Figure 2:
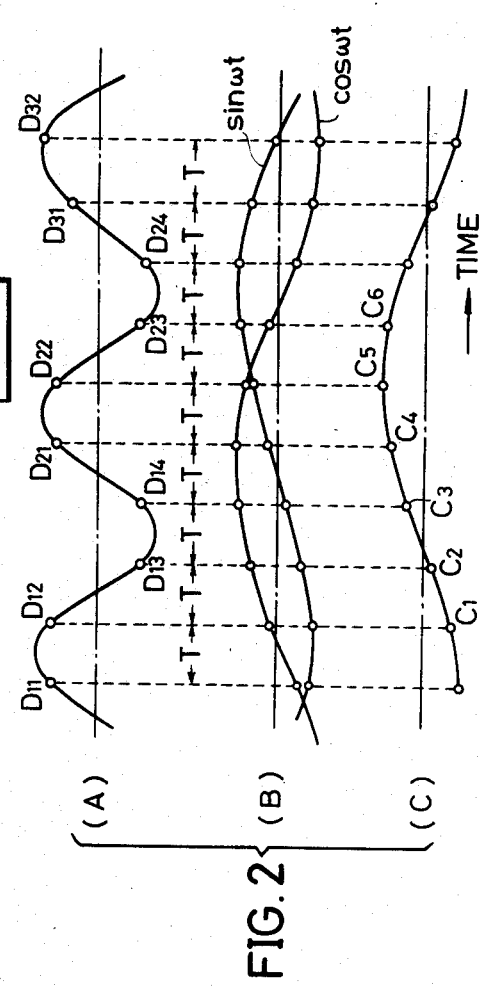
FIGS. 2(A) through 2(C) show signal waveforms for explaining the operation of the recording system of the carrier chrominance signal recording and/or reproducing apparatus according to the present invention.

The low-frequency signal generator 35 generates two kinds of digital signals which are obtained by sampling two kinds of sinusoidal waves $\cos \omega t$ and $\sin \omega t$ at the same sampling frequency $f_s$ and then quantizing the signals. The sinusoidal waves $\cos \omega t$ and $\sin \omega t$ have a frequency which is equal to a chrominance subcarrier frequency $f_c$ (40 times the horizontal scanning frequency $f_H$, for example) of the frequency converted carrier chrominance signal which is to be recorded, where $\omega$ represents the angular frequency and is equal to $2\pi f_c$, and have phase that mutally differ by 90°. In other words, the low-frequency signal generator 35 produces a first digital signal in which sampled data indicated by small circles on the sinusoidal wave $\cos \omega t$ shown in FIG. 2(B) are time sequentially multiplexed, and supplies this first digital signal to the digital multiplier 33. On the other hand, the low-frequency signal generator 35 produces a second digital signal in which sampled data indicated by small circles on the sinusoidal wave $\sin \omega t$ shown in FIG. 2(B) are time sequentially multiplexed, and supplies this second digital signal to the digital multiplier 34.

Therefore, the digital multiplier 33 produces a digital signal related to a first frequency converted color difference signal which is obtained by amplitude-modulating the sinusoidal wave $\cos \omega t$ by the color difference signal M, and supplies this digital signal to an adding circuit 36. At the same time, the digital multiplier 34 produces a digital signal related to a second frequency converted color difference signal which is obtained by amplitude-modulating the sinusoidal wave $\sin \omega t$ by the color difference signal N, and supplies this digital signal to the adding circuit 36. Hence, a digital signal related to a frequency converted carrier chrominance signal which is quadrature-modulated by the two kinds of color difference signals M and N, is obtained from the adding circuit 36. The output digital signal of the adding circuit 36 is produced through an output terminal 37, and is supplied to the mixing circuit 18 shown in FIG. 1. The output digital signal of the adding circuit 36, is a signal in which sampled data indicated by small circles $C_1$, $C_2$, $C_3$, ... on the waveform of the frequency converted carrier chrominance signal shown in FIG. 2(C) are time sequentially multiplexed. The sampled data $C_1$ may be described by $[(D_{11}-D_{13})/2] \cos \omega t + D_{12} \sin \omega t$, the sampled data $C_2$ may be described by $-D_{13} \cos \omega t + [(D_{12}-D_{14})/2] \sin \omega t$, the sampled data $C_3$ may be described by $[(-D_{13}+D_{21})/2] \cos \omega t - D_{14} \sin \omega t$, the sampled data $C_4$ may be described by $D_{21} \cos \omega t + [(-D_{14}+D_{22})/2] \sin \omega t$, the sampled data $C_5$ may be described by $[(D_{21}-D_{23})/2] \cos \omega t + D_{22} \sin \omega t$, and the sampled data $C_6$ ma be described by $D_{23} \cos \omega t + [(D_{22}-D_{24})/2] \sin \omega t$.

As described before, the input digital color signal applied to the input terminal 30 is subjected to a phase shift process so that the phase is shifted by 90° for every 1H, and for this reason, a digital color signal which is converted into the low-frequency range and in which the phase of the chrominance subcarrier is shifted by 90° for every 1H is obtained from the output terminal 37.

Returning now to the description of the recording system shown in FIG. 1, the making circuit 18 mixes the digital signal from the luminance signal processing circuit 13 and the frequency converted digital color signal from the frequency converter 16. An output mixed digital signal of the mixing circuit 18 is supplied to a digital-to-analog (D/A) converter 19 wherein the mixed digital signal is converted into an analog signal. The output analog signal of the D/A converter 19 is a frequency division multiplexed signal in which the frequency modulated luminance signal and the frequency converted carrier chrominance signal are frequency-division multiplexed. The output frequency division multiplexed signal of the D/A converter 19 is passed through an amplifier 20, and is supplied to rotary heads 21 and 22 having gaps of mutually different azimuth angles. The rotary heads 21 and 22 alternately record the frequency division multiplexed signal on tracks on a magnetic tape 23 without a guard band between two adjacent tracks, or with an extremely narrow guard band formed between the two adjacent tracks.

Next, description will be given with respect to an embodiment of a reproducing system of the carrier chrominance signal recording and/or reproducing apparatus according to the present invention, by referring to FIG. 6. In FIG. 6, an analog color video signal which is reproduced from the magnetic tape 23 by the rotary heads 21 and 22, is amplified and formed into a single continuous signal in a reproducing circuit 40. An output signal of the reproducing circuit 40 is sampled at the sampling frequency $f_s$ described before and is quantized into a digital signal in an A/D converter 41. The output digital signal of the A/D converter 41 is supplied to a luminance signal processing circuit 42 and to a lowpass filter 43. The lowpass filter 43 separates from the output digital signal of the A/D converter 41 a digital color signal related to the frequency converter carrier chrominance signal. The output digital color signal of the lowpass filter 43 is supplied to a frequency converter 44 wherein the digital color signal is subjected to a frequency conversion with an output digital signal of a signal generator 45. A digital color signal related to a carrier chrominance signal which is converted back into the original frequency range, is obtained from the frequency converter 44.

Figure 7:
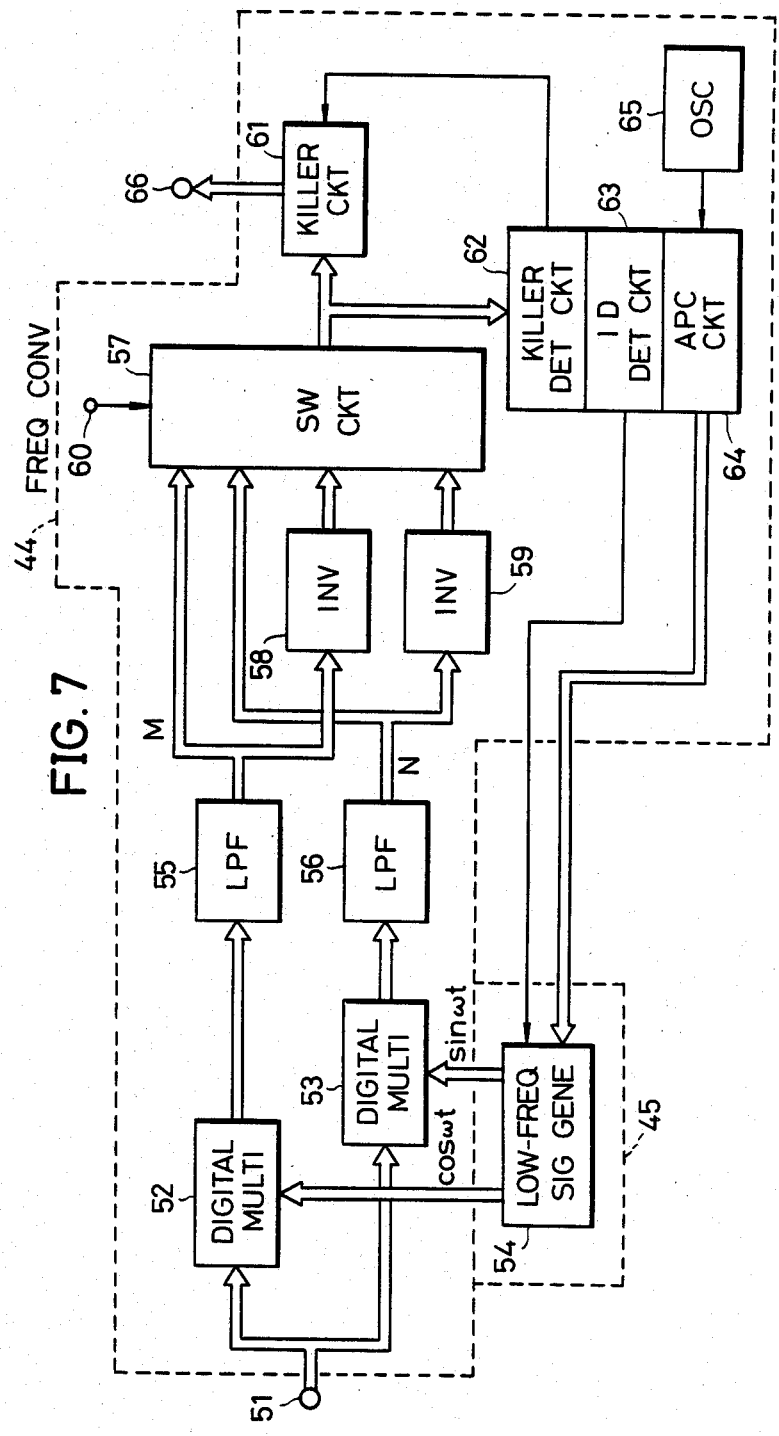
FIG. 7 is a systematic block diagram showing an embodiment of an essential part of the block system shown in FIG. 6.

For example, the frequency converter 44 has a construction shown in FIG. 7. In FIG. 7, the frequency converted digital color signal from the lowpass filter 43, is applied to an input terminal 51 and is supplied to digital multipliers 52 and 53.

On the other hand, the signal generator 45 is constituted by a low-frequency signal generator 54 which has a construction similar to the low-frequency signal generator 35 described before. The low-frequency signal generator 54 produces two kinds of digital signals which are obtained by sampling the sinusoidal waves $\cos \omega t$ and $\sin \omega t$ described before by the sampling frequency $f_s$ which is four times the chrominance subcarrier frequency $f_{sc}$ and then quantizing the sampled signals. The output digital signal of the low-frequency signal generator 54 which is related to the sinusoidal wave $\cos \omega t$, is supplied to the digital multiplier 52. On the other hand, the output digital signal of the low-frequency signal generator 54 which is related to the sinusoidal wave $\sin \omega t$, is supplied to the digital multiplier 53. Accordingly, the digital multiplier 52 performs a multiplication between the digital signal which is related to the frequency converted carrier chrominance signal and is described by $M \cos \omega t + N \sin \omega t$ and the digital signal which is related to the sinusoidal wave $\cos \omega t$, and supplies to a lowpass filter 55 a digital signal which is related to a signal described by the following equation (1).

$$(M\cos\omega t + N\sin\omega t) \cdot \cos\omega t = M\cos^2\omega t + N\cos\omega t \sin\omega t = \quad (1)$$
$$(M/2) \cdot (1 + \cos 2\omega t) + (N/2) \cdot \sin 2\omega t$$

On the other hand, the digital multiplier 53 supplies to a lowpass filter 56 a digital signal which is related to a signal described by the following equation (2).

$$(M\cos\omega t + N\sin\omega t) \cdot \sin\omega t = M\cos\omega t \sin\omega t + N\sin^2\omega t = \quad (2)$$
$$(M/2) \cdot \sin 2\omega t + (N/2) \cdot (1 - \cos 2\omega t)$$

The cutoff frequencies of the lowpass filters 55 and 56 are selected to such frequencies such that a digital signal related to the frequency converted carrier chrominance signal will be passed and a digital signal related to a frequency component which is two times the chrominance subcarrier frequency $f_c$ of the frequency converted carrier chrominance signal will be blocked. Accordingly, the lowpass filter 55 eliminates harmonic components including $\cos 2\omega t$ and $\sin 2\omega t$ in the equation (1), and only produces a digital signal of the color difference signal M which is described by (M/2). This output digital signal of the lowpass filter 55 is supplied to a switching circuit 57 and to an inverter 58. At the same time, the lowpass filter 56 eliminates harmonic components including $\cos 2\omega t$ and $\sin 2\omega t$ in the equation (2), and only produces a digital signal of the color difference signal N which is described by (N/2). This output digital signal of the lowpass filter 56 is supplied to the switching circuit 57 and to an inverter 59.

The inverters 58 and 59 respectively invert the polarity of the input digital signal, that is, multiply "−1" to the digital data, and supply the inverted digital data to the switching circuit 57. The switching circuit 57 simultaneously latches the output digital color difference signals of the lowpass filters 55 and 56 and the inverters 58 and 59, and sequentially produces the output digital color difference signals responsive to a switching signal (drive pulse signal) applied to an input terminal 60. The output digital color difference signals are produced from the switching circuit 57 in a sequence of the data related to the color difference signal M from the lowpass filter 55, the data related to the color difference signal N from the lowpass filter 56, the data related to the inverted color difference signal M from the inverter 58, and the data related to the inverted color difference signal N from the inverter 59. Then, the switching circuit 57 simultaneously latches the next output digital color difference signals of the lowpass filters 55 and 56 and the inverters 58 and 59 and sequentially produces these output digital color difference signals responsive to the switching signal applied to the input terminal 60, immediately after the output data of the inverter 59 is produced from the switching circuit 57. The operation of the switching circuit 57 is repeated for subsequence output digital color difference signals of the lowpass filters 55 and 56 and the inverters 58 and 59. The repetition frequency of the switching signal applied to the input terminal 60, is selected to a frequency which is equal to four times the chrominance subcarrier frequency $f_{sc}$, that is, equal to the sampling frequency $f_s$. As described before, the data are sequentially produced from the switching circuit 57 in the sequence of M, N, −M, −N, M, . . . . Thus, the data produced from the switching circuit 57, is the same as the output digital signal of the bandpass filter 14 described before in conjunction with FIG. 2(A). In other words, the output digital signal of the switching circuit 57 is a digital color signal which is obtained by sampling the carrier chrominance signal having the original chrominance subcarrier frequency $f_{sc}$ at the sampling frequency $f_s$ and then quantizing the sampled signal. The output digital color signal of the switching circuit 57 is supplied to a killer circuit 61, a killer detection circuit 62, an ID detection circuit 63, and an APC circuit 64.

The killer detection circuit 62 detects the existence of the color burst signal, so as to detect whether the input signal is a color video signal or a monochrome (black-and-white) video signal. When the color burst signal does not exist in the input signal and the killer detection circuit 62 detects that the input signal is a monochrome video signal, the killer detection circuit 62 operates the killer circuit 61 so that an output is not produced by performing a known operation by a digital signal processing. In addition, the ID detection circuit 63 compares the phase of a reproduced color burst signal with the phase of an output signal of an oscillator having a frequency of 3.58 MHz. The ID detection signal 63 detects a sudden change in the phase of the reproduced color burst signal occurring immediately after the switching of the rotary heads or occurring due to dropout, and performs a known operation of shifting the phase of the low-frequency signal from the low-frequency signal generator 54 by 180° by a digital signal processing. Furthermore, the APC circuit 64 compares the phase of an output reference signal of an oscillator 65 having a frequency which is the same as the sampling frequency $f_s$, with the phase of the reproduced digital color signal from the switching circuit 57, and extracts a time base deviation component in the reproduced digital color signal. The APC circuit 64 performs an operation of variably controlling the phase of the output signal of the low-frequency signal generator 54, so that the time base deviation component is eliminated.

The digital color signal related to the carrier chrominance signal which is returned to the original frequency range and is eliminated of the time base deviation component, is passed through the killer circuit 61, and is produced through an output terminal 66. The digital color signal obtained through the output terminal 66, is supplied to a phase shift processing circuit 46 shown in FIG. 6. The phase shift processing circuit 46 has a circuit construction similar to the circuit construction of the phase shift processing circuit 15 described before. The phase shift processing circuit 46 may have a circuit construction shown in FIG. 8 or FIG. 9. It should be noted that the phase shift processing circuit 46 performs a phase shift process so that the phase of the chrominance subcarrier of the reproduced digital color signal is shifted in a direction opposite to the direction in which the phase is shifted at the time of the recording.

Therefore, a reproduced digital color signal related to the carrier chrominance signal which is returned to the original frequency range and is eliminated of the phase shift in the chrominance subcarrier, is obtained from the phase shift processing circuit 46, and is supplied to a comb filter 47. The comb filter 47 eliminates low-frequency components which are reproduced as crosstalk from the adjacent tracks. An output signal of the comb filter 47 is supplied to a mixing circuit 48, and is mixed with an output reproduced digital luminance signal of the luminance signal processing circuit 42. An output digital signal of the mixing circuit 42 is supplied to a D/A converter 49 wherein the digital signal is converted into an analog signal, and the output analog signal of the D/A converter 49 is produced through an output terminal 50 as a reproduced color video signal.

Figure 8:
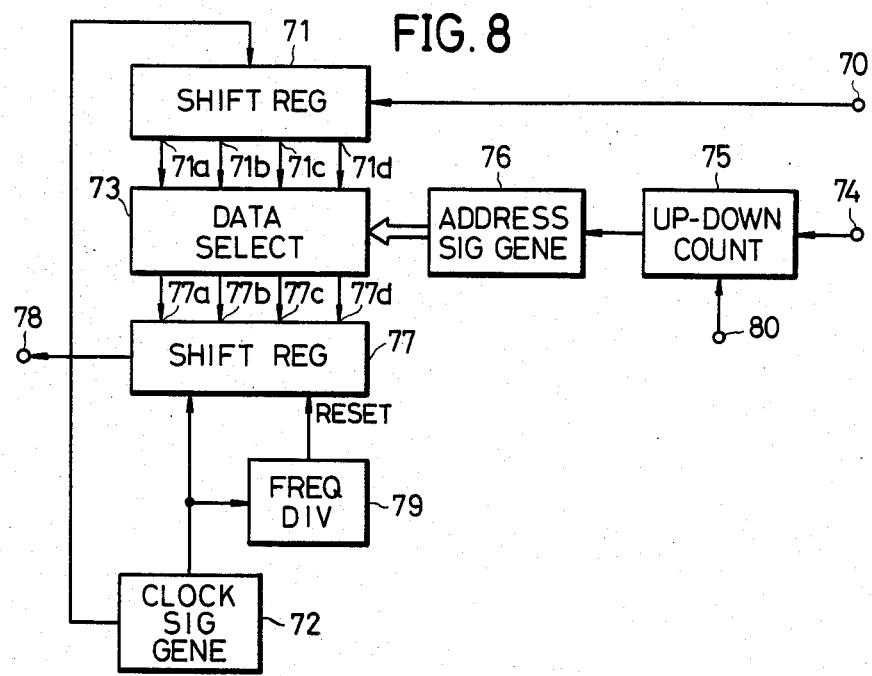
FIG. 8 is a systematic block diagram showing a first embodiment of a phase shift processing circuit in the recording system and the reproducing system of the carrier chrominance signal recording and/or reproducing apparatus according to the present invention.

FIG. 8 shows a first embodiment of the phase shift processing circuits 15 and 46 which perform the phase shift process according to the method described before in conjunction with FIGS. 3(A) through 3(D). In FIG. 8, the digital color signal applied to an input terminal 70, is supplied to a shift register 71 and is successively shifted responsive to a clock signal (shift pulse signal) from a clock signal generator 72. At a point in time when four sampled data are stored in the shift register 71, a data selector 73 receives the four sampled data from the shift register 71 in parallel. In other words, the shift register 71 stores the sampled data which are supplied thereto in series, and supplies four sampled data to the data selector 73 in parallel every time four sampled data are stored in the shift register 71. On the other hand, a horizontal synchronizing pulse signal which is applied to an input terminal 74, is supplied to an up-down counter 75 and counted. A counted value in the up-down counter 75 is supplied to an address signal generator 76. The up-down counter 75 is designed to produce one of four possible counted values for every 1H. The up-down counter 75 produces the four counted values in a predetermined sequence, and the predetermined sequence occurs with a period of 4H. As a result, the address signal which is supplied to the data selector 73 from the address signal generator 76 also changed with a period of 4H.

Accordingly, the four sampled data $D_{i1}$, $D_{i2}$, $D_{i3}$, and $D_{i4}$ which have a quantization number of 4 bits and are obtained in parallel from respective output terminals 71a, 71b, 71c, and 71d of the shift register 71, are supplied in parallel to input terminals 77a, 77b, 77c, and 77d of a shift register 77 from the data selector 73 which switches the transmission path for the sampled data to one of four possible connections for every 1H. The data selector 73 switches the transmission path to the four connections in a specific sequence, and the specific sequence of the switching occurs with a period of 4H. In other words, the data selector 73 connects the terminals 71a and 77a, the terminals 71b and 77b, the terminals 71c and 77c, and the terminals 71d and 77d during a certain time period of 1H. During a next time period of 1H, the data selector 73 connects the terminals 71a and 77d, the terminals 71b and 77a, the terminals 71c and 77b, and the terminals 71d and 77c. During a next time period of 1H, the data selector 73 connects the terminals 71a and 77c, the terminals 71b and 77d, the terminals 71c and 77a, and the terminals 71d and 77b. Further, during a next time period of 1H, the data selector 73 connects the terminals 71a and 77b, the terminals 71b and 77c, the terminals 71c and 77d, and the terminals 71d and 77a. This specific sequence of switching is performed with a period of 4H.

The shift register 77 produces in series the sampled data which are supplied thereto in parallel through the input terminals 77a through 77d, responsive to a clock signal from the clock signal generator 72. Hence, the sampled data are produced from the shift register 77 in a sequence of the data received through the input terminal 77a, the data received through the input terminal 77b, the data received through the input terminal 77c, and the data received through the input terminal 77d. The sampled data produced from the shift register 77 are obtained through an output terminal 78. The shift register 77 is reset responsive to a signal which is obtained by frequency-dividing the output clock signal of the clock signal generator 72 by ¼ in a frequency divider 79. Accordingly, digital clock signals in which the sampled data are respectively arranged in the sequences shown in FIGS. 3(A), 3(B), 3(C), and 3(D), are obtained in series through the output terminal 78.

The counting direction (up-count or down-count) of the up-down counter 75 is reversed for every one track scanning period, responsive to a drum pulse signal which is applied to an input terminal 80. As a result, the direction in which the phase of the output digital color signal is shifted, is reversed for every one track scanning period.

Figure 9:
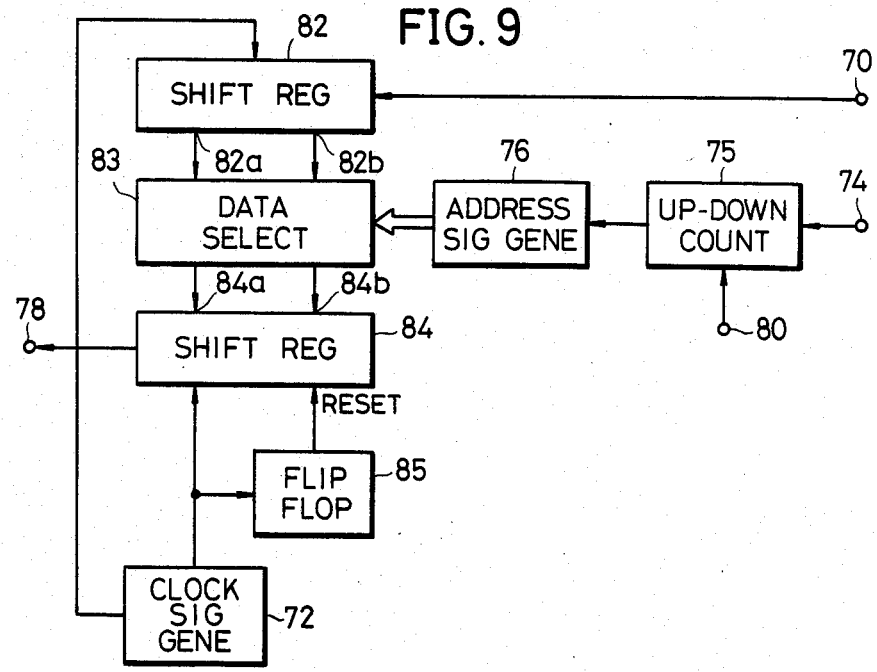
FIG. 9 is a systematic block diagram showing a second embodiment of a phase shift processing circuit in the recording system and the reproducing system of the carrier chrominance signal recording and/or reproducing apparatus according to the present invention.

Next, description will be given with respect to a second embodiment of the phase shift processing circuit 15 and 46 which perform the phase shift process according to the method described before in conjunction with FIGS. 4(A) through 4(D), by referring to FIG. 9. In FIG. 9, those parts which are the same as those corresponding parts in FIG. 8 are designated by the same reference numerals, and their description will be omitted.

In FIG. 9, the digital color signal applied to the input terminal 70, is supplied to a shift register 82 and is successively shifted responsive to a clock signal (shift pulse signal) from the clock signal generator 72. At a point in time when two sampled data are stored in the shift register 82, a data selector 83 receives the two sampled data from the shift register 82 in parallel, through output terminals 82a and 82b of the shift register 82. In other words, the shift register 82 stores the sampled data which are supplied thereto in series, and supplies two sampled data to the data selector 83 in parallel every time two sampled data are stored in the shift register 82. The data selector 83 rearranges data sequence and inverts the polarity of data as described before in conjunction with FIGS. 4(A) through 4(D) for every 1H. The sampled data from the data selector 83 are supplied in parallel to a shift register 84 through input terminals 84a and 84b.

The shift register 84 produces in series the sampled data which are supplied thereto in parallel through the input terminals 84a and 84b, responsive to a clock signal from the clock signal generator 72. Hence, the sampled data are produced from the shift register 84 in a sequence of the data received through the input terminal 84a, and the data received through the input terminal 84b. The sampled data produced from the shift register 84 are obtained through the output terminal 78. The shift register 84 is reset responsive to a signal which is obtained by frequency-dividing the output clock signal of the clock signal generator 72 by ½ in a flip-flop 85. Accordingly, digital color signals in which the sampled data are respectively arranged in the sequence shown in FIGS. 4(A), 4(B), 4(C), and 4(D), are obtained in series through the output terminal 78.

The present invention is not limited to the embodiments described heretofore. For example, the present invention may also be applied to the recording and/or reproduction of a carrier chrominance signal of the PAL system color video signal. In addition, the recording medium need not be a magnetic tape, and may be a disc-shaped recording medium. In addition, the color difference signal producing circuits 31 and 32 may be designed to substitute every other sampled data which are not extracted, by sampled data which are extracted immediately before or after the respective sampled data which are not extracted.

Further, the present invention is not limited to these embodiments, but various variations and modifications may be made without departing from the scope of the present invention.

What is claimed is:

1. A carrier chrominance signal recording apparatus comprising:
digital color signal producing means for sampling a carrier chrominance signal at a sampling frequency which is four times a chrominance subcarrier frequency, and then quantizing the sampled signal so as to produce a first digital color signal;
a phase shift processing circuit for subjecting said first digital color signal to a phase shift process so as to produce a second digital color signal related to a carrier chrominance signal in which the phase of a chrominance subcarrier is equivalently and successively shifted by approximately 90° in a predetermined direction for every one horizontal scanning period, at least the sequence of sampled data in each data set which is constituted by four or two consecutive sampled data of said first digital color signal being successively rearranged by said phase shift process for each horizontal scanning period so that identical data sequences occur with a period of four horizontal scanning periods;
frequency converter means for converting the output second digital color signal of said phase shift processing circuit into a frequency converted digital color signal which is in a low-frequency range;
a digital-to-analog converter for obtaining an analog frequency converted carrier chrominance signal by subjecting the frequency converted digital color signal to a digital-to-analog conversion; and
recording means for recording the analog frequency converted carrier chrominance signal on a recording medium.

2. A carrier chrominance signal recording apparatus as claimed in claim 1 in which said phase shift processing circuit comprises a first shift register for performing a serial-to-parallel conversion so as to produce said first digital color signal in terms of four consecutive sampled data, a second shift register for performing a parallel-to-serial conversion so as to produce the four sampled data in series, data selector means for switching the four sampled data obtained from said first shift register for every one horizontal scanning period and for supplying the sampled data in parallel to four input terminals of said second shift register with a period of four horizontal scanning periods, and reset means for resetting stored contents of said second shift register every time the four sampled data are produced in series from said second shift register.

3. A carrier chrominance signal recording apparatus as claimed in claim 1 in which said phase shift processing circuit comprises a first shift register for performing a serial-to-parallel conversion so as to produce said first digital color signal in terms of two consecutive sampled data, a second shift register for performing a parallel-to-serial conversion so as to produce the two sampled data in series, data selector means for repeating an operation in which the two sampled data obtained from said first shift register are supplied to said second shift register in parallel with the sequence of the sampled data unchanged during a first horizontal scanning period, the two sampled data are supplied to said second shift register in parallel with the sequence of the two sampled data reversed and with the polarity of one of the two sampled data inverted during a second horizontal scanning period, the two sampled data are supplied to said second shift register in parallel with the sequence of the sampled data unchanged and with the polarity of the two sampled data inverted during a third horizontal scanning period, and the two sampled data are supplied to said second shift register in parallel with the sequence of the two sampled data reversed and with the polarity of the other of the two sampled data inverted during a fourth horizontal scanning period, and reset means for resetting stored contents of said second shift register every time the two sampled data are produced in series from said second shift register.

4. A carrier chrominance signal recording apparatus as claimed in claim 1 in which said frequency converter means comprises a first color difference signal producing means for producing a first digital color difference signal made up of data which are obtained by extracting odd sampled data of said second digital signal and alternately inverting the polarity of the extracted sampled data and data which are formed from the extracted sampled data which are adjacent to even sampled data which are not extracted, a second color difference signal producing means for producing a second digital color difference signal made up of data which are obtained by extracting even sampled data of said second digital signal and alternately inverting the polarity of the extracted sampled data and data which are formed from the extracted sampled data which are adjacent to odd sampled data which are not extracted, a low-frequency signal generator for generating two kinds of digital signals which are obtained by sampling two kinds of signals having a low frequency which is equal to the chrominance subcarrier frequency of the frequency converted carrier chrominance signal and having phases which mutually differ by 90° at the sampling frequency of said first digital color signal and then quantizing the sampled signals, a first digital multiplier for performing a multiplication between one of the two kinds of digital signals generated from said low-frequency signal generator and said first digital color difference signal, a second digital multiplier for performing a multiplication between the other of the two kinds of digital signals generated from said low-frequency signal generator and said second digital color difference signal, and an adding circuit for adding output signals of said first and second digital multipliers and for producing the frequency converted digital color signal related to the frequency converted carrier chrominance signal.

5. A carrier chrominance signal reproducing apparatus for reproducing pre-recorded signals from the recording medium which is recorded by the carrier chrominance signal recording apparatus of claim 1, said reproducing apparatus comprising:
reproducing means for reproducing the analog frequency converted carrier chrominance signal from the recording medium;
digital color signal producing means for producing a frequency converted digital color signal by sampling the reproduced analog frequency converted carrier chrominance signal from said reproducing means at a sampling frequency which is four times the chrominance subcarrier frequency of the carrier chrominance signal and then quantizing the sampled signal;
reproducing frequency converter means for returning the frequency converted digital color signal from said digital color signal producing means into a frequency range which is the same as the frequency range of said second digital color signal, said reproducing frequency converter means producing a third digital color signal in which the sampled data are time-sequentially mutliplexed;
a reproducing phase shift processing circuit for subjecting said third digital color signal to another phase shift process so as to produce a fourth digital color signal related to a reproduced carrier chrominance signal in which the phase of a chrominance subcarrier is equivalently and successively shifted by approximately 90° in a direction opposite to the direction of the phase shift at the time of the recording for every one horizontal scanning period, at least the sequence of sampled data in each data set which is constituted by four or two consecutive sampled data of said third digital color signal being successively rearranged by said other phase shift process for each horizontal scanning period so that identical data sequences occur with a period of four horizontal scanning periods; and
a digital-to-analog converter for obtaining a reproduced carrier chrominance signal by subjecting said fourth digital color signal from said reproducing phase shift processing circuit to a digital-to-analog conversion.

6. A carrier chrominance signal reproducing apparatus as claimed in claim 5 in which said reproducing phase shift processing circuit comprises a first shift register for performing a serial-to-parallel conversion so as to produce said third digital color signal in terms of four consecutive sampled data, a second shift register for performing a parallel-to-serial conversion so as to produce the four sampled data in series, data selector means for switching the four sampled data obtained from said first shift register for every one horizontal scanning period and for supplying the sampled data in parallel to four input terminals of said second shift register with a period of four horizontal scanning periods, and resetting means for resetting stored contents of said second shift register every time the four sampled data are produced in series from said second shift register.

7. A carrier chrominance signal reproducing apparatus as claimed in claim 5 in which said reproducing phase shift processing circuit comprises a first shift register for performing a serial-to-parallel conversion so as to produce said third digital color signal in terms of two consecutive sampled data, a second shift register for performing a parallel-to-serial conversion so as to produce the two sampled data in series, data selector means for repeating an operation in which the two sampled data obtained from said first shift register are supplied to said second shift register in parallel with the sequence of the sampled data unchanged during a first horizontal scanning period, the two sampled data are supplied to said second shift register in parallel with the sequence of the two sampled data reversed and with the polarity of one of the two sampled data inverted during a second horizontal scanning period, the two sampled data are supplied to said second shift register in parallel with the sequence of the sampled data unchanged and with the polarity of the two sampled data inverted during a third horizontal scanning period, and the two sampled data are supplied to said second shift register in parallel with the sequence of the two sampled data reversed and with the polarity of the other of the two sampled data inverted during a fourth horizontal scanning period, and resetting means for resetting stored contents of said second shift register every time the two sampled data are produced in series from said second shift register.

8. A carrier chrominance signal reproducing apparatus as claimed in claim 5 in which said reproducing frequency converter means comprises a low-frequency signal generator for generating two kinds of digital signals which are obtained by sampling two kinds of signals having a low frequency which is equal to the chrominance subcarrier frequency of the reproduced analog frequency converted carrier chrominance signal and having phases which mutually differ by 90° at the sampling frequency of an input frequency converted digital color signal and then quantizing the sampled signals, a first digital multiplier for performing a multiplication between one of the two kinds of digital signals generated from said low-frequency signal generator and said input frequency converted digital color difference signal, a second digital multiplier for performing a multiplication between the other of the two kinds of digital signals generated from said low-frequency signal generator and said input frequency converted digital color difference signal, first and second filters supplied with respective output signals of said first and second digital multipliers for eliminating harmonic components and for producing first and second reproduced digital color difference signals, first and second inverters for independently inverting respective output signals of said first and second filters, and a switching circuit supplied with a switching pulse signal having a frequency which is equal to the sampling frequency of said input frequency converted digital color signal and with the output signals of said first and second filters and said first and second inverters, said switching circuit being switched responsive to said switching pulse signal for every period of said switching pulse signal and producing in sequence the output signal of said first filter, the output signal of said second filter, the output signal of said first inverter, and the output signal of said second inverter in a circulative manner.

* * * * *